(12) United States Patent
Cheng et al.

(10) Patent No.: US 9,055,599 B2
(45) Date of Patent: *Jun. 9, 2015

(54) WIRELESS COMMUNICATION APPARATUS AND WIRELESS COMMUNICATION METHOD

(71) Applicant: Panasonic Intellectual Property Corporation of America, Torrance, CA (US)

(72) Inventors: Jun Cheng, Kyoto (JP); Akihiko Nishio, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 253 days.
This patent is subject to a terminal disclaimer.

(21) Appl. No.: 13/754,645

(22) Filed: Jan. 30, 2013

(65) Prior Publication Data

US 2013/0142153 A1   Jun. 6, 2013

Related U.S. Application Data

(63) Continuation of application No. 13/461,527, filed on May 1, 2012, now Pat. No. 8,391,215, which is a continuation of application No. 12/391,787, filed on Feb. 24, 2009, now Pat. No. 8,223,691, which is a continuation of application No. 10/568,673, filed as application No. PCT/JP2004/012311 on Aug. 20, 2004, now Pat. No. 7,522,544.

(30) Foreign Application Priority Data

Aug. 20, 2003  (JP) ................................. 2003-295972

(51) Int. Cl.
*H04B 7/216* (2006.01)
*H04J 1/00* (2006.01)
(Continued)

(52) U.S. Cl.
CPC ........... *H04W 72/085* (2013.01); *H04L 5/0007* (2013.01); *H04L 5/0042* (2013.01);
(Continued)

(58) Field of Classification Search
CPC ............................. H04W 24/02; H04W 72/04
USPC .......................................... 370/329, 328, 343
See application file for complete search history.

(56) References Cited

U.S. PATENT DOCUMENTS 5,428,816 A   6/1995   Barnett et al.
5,726,978 A   3/1998   Frodigh et al.
(Continued)

FOREIGN PATENT DOCUMENTS

JP   10-191431 A   7/1998
JP   2001-148682 A   5/2001
(Continued)

OTHER PUBLICATIONS
3GPP TR 25.899 V0.2.0, "Technical Specification Group Radio Access Network; HSDPA Enhancements," May 2003, pp. 1-33.
(Continued)

*Primary Examiner* — Nathan Mitchell
(74) *Attorney, Agent, or Firm* — Seed IP Law Group PLLC

(57) ABSTRACT

A wireless communication apparatus is capable of improving communication efficiency by reducing the amount of control information transmitted. A channel quality information extraction section extracts CQI's from a received signal. An allocation control section allocates subcarriers for every communication terminal apparatus and selects a modulation scheme in such a manner that required transmission rate is satisfied for each communication terminal apparatus based on required transmission rate information, etc. and CQI's for communication terminal apparatus of each user. A required subcarrier number determining section decides the number of subcarriers allocated to every communication terminal apparatus so as to satisfy the required transmission rate for each communication terminal apparatus. A required subcarrier number information generating section generates information for the number of subcarriers allocated to every communication terminal apparatus. A subcarrier allocation section allocates packet data to selected subcarriers. Modulating sections adaptively modulate packet data allocated to each subcarrier.

2 Claims, 8 Drawing Sheets

(51) Int. Cl.
*H04W 72/08* (2009.01)
*H04L 5/00* (2006.01)
*H04W 72/04* (2009.01)
*H04W 24/02* (2009.01)

(52) U.S. Cl.
CPC .............. *H04L5/0053* (2013.01); *H04L 5/006* (2013.01); *H04L 5/0064* (2013.01); *H04L 5/0094* (2013.01); *H04W 72/04* (2013.01); *H04W 24/02* (2013.01)

(56) References Cited

U.S. PATENT DOCUMENTS

| | | | |
|---|---|---|---|
| 6,351,461 | B1 | 2/2002 | Sakoda et al. |
| 6,721,569 | B1 | 4/2004 | Hashem et al. |
| 6,801,775 | B1 | 10/2004 | Gibbons et al. |
| 6,940,827 | B2 | 9/2005 | Li et al. |
| 7,069,009 | B2 | 6/2006 | Li et al. |
| 7,126,996 | B2 | 10/2006 | Classon et al. |
| 7,286,609 | B2 | 10/2007 | Maltsev et al. |
| 7,301,989 | B2 | 11/2007 | Tamaki et al. |
| 7,640,373 | B2 | 12/2009 | Cudak et al. |
| 2001/0024427 | A1 | 9/2001 | Suzuki |
| 2002/0102940 | A1 | 8/2002 | Bohnke et al. |
| 2003/0096579 | A1 | 5/2003 | Ito et al. |
| 2003/0128658 | A1 | 7/2003 | Walton et al. |
| 2003/0169681 | A1 | 9/2003 | Li et al. |
| 2003/0232601 | A1 | 12/2003 | Uno |
| 2005/0025039 | A1 | 2/2005 | Hwang et al. |
| 2005/0111406 | A1 | 5/2005 | Pasanen et al. |
| 2005/0201327 | A1* | 9/2005 | Kim et al. ............... 370/329 |
| 2005/0201474 | A1* | 9/2005 | Cho et al. ............... 375/260 |
| 2005/0220002 | A1 | 10/2005 | Li et al. |
| 2005/0249127 | A1 | 11/2005 | Huo et al. |
| 2006/0209669 | A1* | 9/2006 | Nishio ............... 370/208 |
| 2006/0215603 | A1* | 9/2006 | Nishio et al. ............... 370/329 |

FOREIGN PATENT DOCUMENTS

| | | |
|---|---|---|
| JP | 2001-238269 A | 8/2001 |
| JP | 2002-252619 A | 9/2002 |
| JP | 2003-18117 A | 1/2003 |
| JP | 2003-158500 A | 5/2003 |
| JP | 2003-198651 A | 7/2003 |
| JP | 4490921 B2 | 6/2010 |
| JP | 4722212 B2 | 7/2011 |
| JP | 4872012 B2 | 2/2012 |
| JP | 5014506 B2 | 8/2012 |
| WO | 02/49306 A2 | 6/2002 |
| WO | 02/49385 A2 | 6/2002 |
| WO | 03/001761 A1 | 1/2003 |

OTHER PUBLICATIONS

Fujii et al., "A Study on Radio Resource Allocation Method with Various Data Rate Transmission for Widebang Mobile Communication Systems," Technical Report of IEICE, Aug. 31, 2001, vol. 101, No. 280, pp. 1-6, RCS2001-102, with partial English Translation.

Hara et al., "Shuhasu Scheduling MC-CDMA ni Okeru Frame Kosei to Seigyo Hoho ni Kansuru Kento," The Institute of Electronics, Information and Communication Engineers Gijutsu Kenkyu Hokoku, vol. 102, No. 206, Jul. 12, 2002, pp. 67-72.

Hara et al., "Shuhasu Scheduling o Mochi ita MC-CDM Hoshiki," The Institute of Electronics, Information and Communication Engineers Gijutsu Kenkyu Hokoku, vol. 102, No. 206, Jul. 12, 2002, pp. 61-66.

Japanese Office Action, dated Dec. 15, 2009.

Notice of the Reasons for Rejection, dated May 18, 2010.

PCT International Search Report, dated Nov. 30, 2004.

Supplementary European Search Report, dated Dec. 6, 2011.

Ura et al., "Kokoritsu Data Tsushin-yo MC-CDMA Hoshiki no Ichi Kento," The Institute of Electronics, Information and Communication Engineers Gijutsu Kenkyu Hokoku, vol. 100, No. 664, Mar. 2, 2001, pp. 105-110.

Wong et al., "Multiuser subcarrier allocation for OFDM transmission using adaptive modulation," Proc. IEEE VTC Spring, Jul. 1999, vol. 1, pp. 479-483.

3GPP TR 25.858 V5.0.0. "3rd Generation Partnership Project; Technical Specification Group Radio Access Network: High Speed Downlink Packet Access: Physical Layer Aspects (Release 5)," Mar. 2002. 31 pages.

3GPP TR 25.899 V0.1.0. "3rd Generation Partnership Project; Technical Specification Group Radio Access Network: HSDPA Enhancements; (Release 6)," Mar. 2003, 20 pages.

Lucent Technologies, "Variable rate channel quality feedback in HSDPA," 12A010058, Agenda Item: AI 5.4, HSDPA, TSG-RAN WG1 and WG2 Adhoc on HSDPA, Sophia Antipolis, France, Nov. 5-7, 2001, 16 pages.

Mitsubishi Electric, "Text proposal for NACK-based CQI feedback (TR 25.999 6.1.1)," Tdoc R1-030490, Agenda Item: 15.1 (HSDPA Enhancements), 3GPP TSG RAN WG1#32, Paris, France. May 19-23, 2003. 7 pages.

Philips, "Discussion and text proposal for CQI enhancement in compressed mode," Tdoc R1-030473, Agenda Item: 15.1 3GPP TSG RAN WG1#32 Marne-la-Valle Paris France May 19-23, 2003 4 pages.

Office Action, dated Feb. 25, 2015, for corresponding U.S. Appl. No. 14/183,830, 32 pages.

* cited by examiner

| SNR REPORT BIT | 3 | 1 | 2 | 2 | 3 | 1 | 0 | 2 |

PRIOR ART

FIG.1

PRIOR ART

| SNR REPORT BIT | MODULATION SCHEME |
|---|---|
| 0 | NOT TRANSMITTED |
| 1 | QPSK |
| 2 | 16QAM |
| 3 | 64QAM |

FIG.2

| SNR REPORT BIT | 3 | 3 |
|---|---|---|
| SUBCARRIER NUMBER INFORMATION | 0 | 4 |

FIG.6

WIRELESS COMMUNICATION APPARATUS AND WIRELESS COMMUNICATION METHOD

CROSS-REFERENCE(S) TO RELATED APPLICATION(S)

This is a continuation of U.S. application Ser. No. 13/461,527 filed May 1, 2012, which is a continuation of U.S. application Ser. No. 12/391,787 filed Feb. 24, 2009 (now U.S. Pat. No. 8,223,691), which is a continuation of U.S. application Ser. No. 10/568,673 filed Apr. 7, 2006 (now U.S. Pat. No. 7,522,544), which is a U.S. National Stage under 35 USC 371 of PCT/JP2004/012311 filed Aug. 20, 2004, which is based on JP 2003-295972 filed Aug. 20, 2003, the entire contents of each of which are incorporated by reference herein.

BACKGROUND

1. Technical Field

The present invention relates to a wireless communication apparatus and subcarrier allocation method. More particularly, the present invention relates to a wireless communication method and subcarrier allocation method combining adaptive modulation and frequency scheduling.

2. Description of the Related Art

A multi-user adaptive modulation OFDM system is a system for carrying out effective scheduling for an entire system according to a propagation path of each mobile station. Specifically, a base station apparatus is constituted by a system for allocating a plurality of subcarriers appropriate for each user based on channel quality (frequency division user multiplexing), and selecting appropriate modulation coding schemes (hereinafter referred to as "MCS") for each subcarrier. Namely, a base station apparatus is capable of carrying out multi-user high-speed data communication by allocating subcarriers in a manner that is the most effective utilization of frequency capable of satisfying the communication quality (for example, minimum transmission rate, error rate) desired by each user based on channel quality, selecting MCS to ensure maximum throughput for each subcarrier, and carrying out data transmission. In this way, in a multi-user adaptive modulation OFDM system such as, for example, "MC-CDM Method Using Frequency Scheduling," Technical Report of the Institute of Electronics Information and Communication Engineers of Japan, RCS2002-129, July 2002, pp. 61-pp. 66), a reporting method for reporting channel quality information from each mobile station to a base station apparatus is proposed.

An MCS selection table decided in advance is used in the selection of MCS. An MCS selection table shows correspondence between reception quality such as CIR (Carrier to Interference Ratio) etc. and error rates such as packet error rate (hereinafter referred to as "PER") or bit error rate (hereinafter referred to as "BER") etc. for each MCS modulation scheme and error encoding scheme. An MCS of a maximum speed capable of satisfying the desired error rate is then selected based on measured reception quality in MCS selection.

However, in the related art, in frequency division user multiplexing, each mobile station reports channel quality information for all subcarriers to a base station apparatus. FIG. 1 shows a reporting format of signal to noise ratio (hereinafter referred to as "SNR") of channel quality information reported from a mobile station to a base station apparatus of the related art, and FIG. 2 is a view showing a relationship between SNR report bits and modulation scheme. As shown in FIG. 1, the base station apparatus allocates subcarriers and performs adaptive modulation by receiving notification of SNR report bits for every subcarrier in subcarrier order from each communication terminal apparatus for all subcarriers in the communication band. In this event, in the case that transmission by 64 QAM adopted as a modulation scheme satisfying the desired transmission rate and PER is required, the base station apparatus selects the first or fifth subcarrier for which an SNR report bit is 3, and allocates packet data employing 64 QAM to the first or fifth subcarrier.

However, with the base station apparatus and subcarrier allocation method of the related art, each mobile station reports channel quality information for all subcarriers to the base station apparatus, regardless of whether only some of the subcarriers of all of the subcarriers within the communication band are used. The amount of channel quality control information therefore becomes extremely large in accompaniment with increase in the number of mobile stations and number of subcarriers, and communication efficiency therefore falls.

BRIEF SUMMARY

It is therefore an object of the present invention to provide a wireless communication apparatus and subcarrier allocation method capable of improving communication efficiency by reducing the amount of control information transmitted.

According to a first aspect of the present invention, a wireless communication apparatus is comprised of a subcarrier number determining section determining a number of subcarriers, of all subcarriers within a communication band, to be allocated to each communicating party in such a manner as to achieve transmission rates required by each communicating party, a first transmission section transmitting a number of subcarriers determined by the subcarrier number determining section to each communicating party, and an allocation control section selecting subcarriers allocated with packet data for every communicating party based on required transmission rate information for each communicating party and channel quality information for the number of subcarriers for each communicating party extracted from a received signal.

According to a further aspect of the present invention, communication terminal apparatus comprises a subcarrier selection section communicating with the wireless communication apparatus and selecting subcarriers of the number of subcarriers using information for the number of subcarriers extracted from the received signal in order of good reception quality, a channel quality information generating section generating the channel quality information for subcarriers selected at the subcarrier selection section, and a second transmission section transmitting the channel quality information generated by the channel quality information generating section.

According to a still further aspect of the present invention, base station apparatus is provided with the wireless communication apparatus.

According to a yet further aspect of the present invention, a subcarrier allocation method comprises the steps of determining a number of subcarriers, of all subcarriers within a communication band, to be allocated to each communicating party in such a manner as to achieve transmission rates required by each communicating party, transmitting information for a determined number of subcarriers to each communicating party, and selecting subcarriers allocated with packet data for every communicating party based on required transmission rate information for each communicating party and channel quality information for the number of subcarriers for each communicating party extracted from the received signal.

BRIEF DESCRIPTION OF THE SEVERAL VIEWS OF THE DRAWINGS

Figure 1:
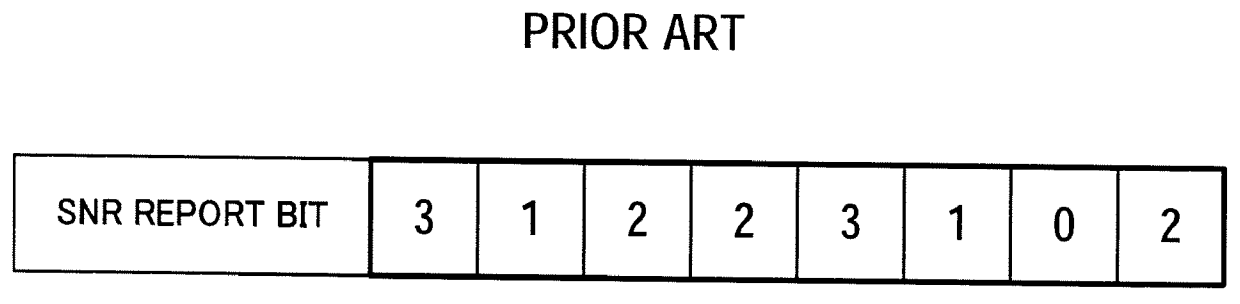

FIG. 1 is a view showing an SNR reporting format of the related art;

FIG. 2 is a view showing a relationship between SNR report bits and modulation scheme;

FIG. 6 is a view showing an SNR reporting format for the first embodiment of the present invention;

DETAILED DESCRIPTION

The following is a detailed description with reference to the drawings of preferred embodiments of the present invention.

First Embodiment

Figure 3:
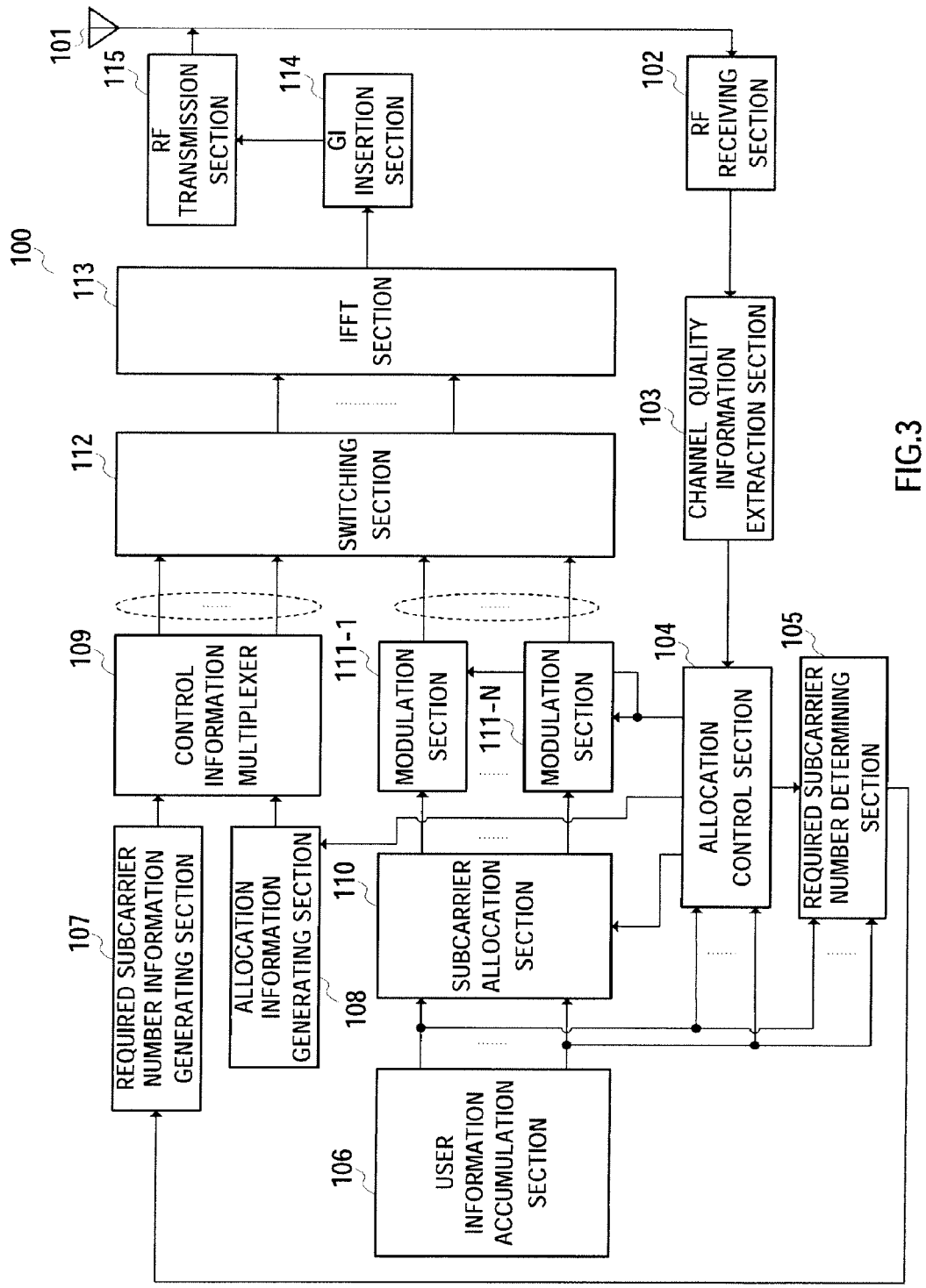
FIG. 3 is a block diagram showing a configuration for a wireless communication apparatus of a first embodiment of the present invention.

FIG. 3 is a block diagram showing a configuration for wireless communication apparatus 100 of a first embodiment of the present invention.

RF receiving section 102 down-converts etc. a received signal received by antenna 101 from a radio frequency to a baseband frequency for output to channel quality information extraction section 103.

Channel quality information extraction section 103 extracts CQI's (Channel Quality Indicators) constituting channel quality information from the received signal input by RF receiving section 102 for output to allocation control section 104. Further, channel quality information extraction section 103 extracts subcarrier identification information indicating subcarriers selected by each communication terminal apparatus from the received signal for output to allocation control section 104.

Allocation control section 104 allocates some of the subcarriers from within all of the subcarriers within a predetermined communication band to CQI's inputted by channel quality information extraction section 103 and transmission information inputted to each communication terminal apparatus from user information accumulation section 106 described later, and selects modulation schemes for allocated subcarriers for every subcarrier. Namely, allocation control section 104 selects subcarriers and modulation schemes in such a manner as to achieve the required transmission rate or more for each communication terminal apparatus and carries out allocation of subcarriers and modulation schemes to each communication terminal apparatus in such a manner as to give less than a predetermined PER value for every subcarrier. Allocation control section 104 then outputs allocated subcarrier allocation information to subcarrier allocation section 110 and outputs modulation scheme information for the selected modulation scheme to modulation sections 111-1 to 111-N. Required subcarrier number determining section 105 constituting a section for determining the number of subcarriers obtains the number of subcarriers that can be allocated to each communication terminal apparatus from user information for the communication terminal apparatus of each user inputted by user information accumulation section 106.

Namely, required subcarrier number determining section 105 determines the number of subcarriers in such a manner as to give the required transmission rate or more at each user communication terminal apparatus. During this time, required subcarrier number determining section 105 determines the number of subcarriers while giving a view to maintaining a slight margin with respect to the required transmission rate in anticipation of a drop in reception quality due to fading fluctuation. Further, in the event that the total amount of data for CQI's for the acquired number of subcarriers and subcarrier number information is less than the total amount of data for only the CQI's for all of the subcarriers, the required subcarrier number determining section 105 outputs the obtained number of subcarriers to required subcarrier number information generating section 107 as subcarrier number information, and, in the event that the total amount of data for the CQI's and the subcarrier number information for the obtained number of subcarriers is greater than the total amount of data for only CQI's for all of the subcarriers, the total number of subcarriers (for example, 64) within the communication band is outputted to the required subcarrier number information generating section 107 as subcarrier number information.

User information accumulation section 106 stores user information for the required transmission rates and data type, etc., together with data to be transmitted to each communication terminal apparatus and outputs this to allocation control section 104, required subcarrier number determining section 105 and subcarrier allocation section 110, as necessary. Here, required transmission rate information is, for example, information about the proportion of the amount of data per unit time required by a communication terminal apparatus of one user with respect to the amount of data per unit time required by all communication terminal apparatus. User information accumulation section 106 can update the stored user information by inputting user information from a control section (not shown) at a predetermined timing.

Required subcarrier number information generating section 107 outputs subcarrier number information inputted by required subcarrier number determining section 105 to control information multiplexer 109 as control channel information.

Allocation information generating section 108 generates control information constituted by a pair consisting of identification information indicating each subcarrier inputted by allocation control section 104 and subcarrier modulation scheme information and outputs the generated control information to control information multiplexer 109.

Control information multiplexer 109 multiplexes control information for the number of subcarriers inputted by the required subcarrier number information generating section 107 and allocation information and modulation scheme information inputted by allocation information generating section 108 and outputs multiplexed control information to switching section 112 for every subcarrier. Control information multiplexer 109 multiplexes subcarrier number information and allocation information, as well as control information other than modulation scheme information.

Subcarrier allocation section 110 allocates packet data to communication terminal apparatus for each user for all of the subcarriers within the communication band using allocation information inputted by allocation control section 104 and user information inputted by user information accumulation section 106 and outputs packet data allocated to each subcarrier to modulation sections 111-1 to 111-N carrying out modulation using modulation schemes selected for every subcarrier.

Modulation sections 111-1 to 111-N are provided in the same number as there are subcarriers, and modulate packet data inputted by subcarrier allocation section 110 using a modulation scheme of the modulation scheme information inputted by allocation control section 104 and output the result to switching section 112.

Switching section 112 switches control information outputted by control information multiplexer 109 and inputted after modulation by modulators (not shown) and packet data modulated at modulation sections 111-1 to 111-N and outputs this information to inverse fast Fourier transform (hereinafter referred to as IFFT) section 113.

IFFT section 113 then subjects control information inputted by switching section 112 for every subcarrier or packet data for every subcarrier to IFFT and outputs the result to guard interval (hereinafter referred to as "GI") insertion section 114.

GI insertion section 114 inserts GI's into control information or packet data inputted by IFFT section 113 and outputs this to RF transmission section 115.

RF transmission section 115 up-converts etc. control information or packet data inputted from GI insertion section 114 from a baseband frequency to a radio frequency for transmission to antenna 101.

Figure 4:
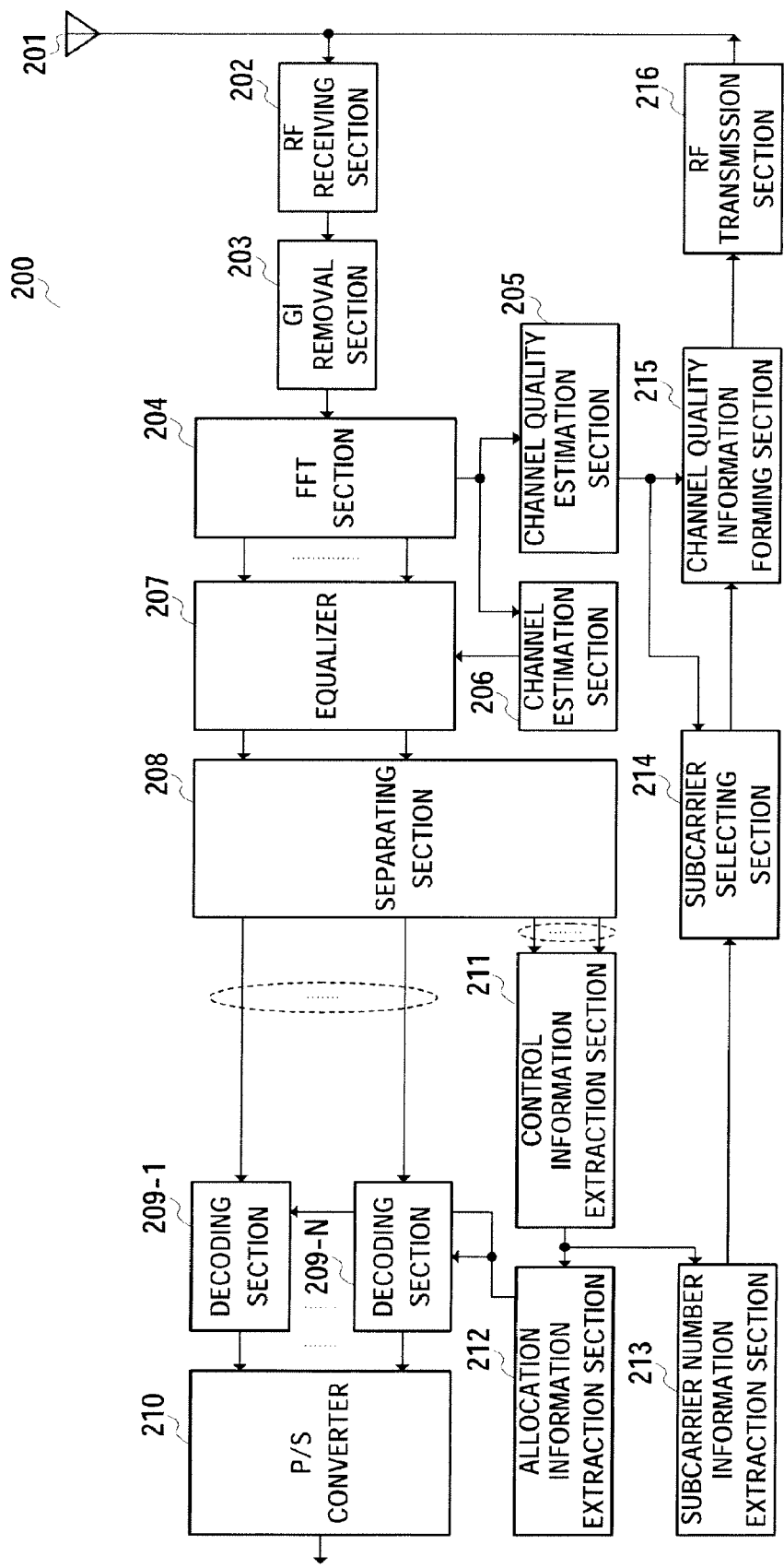
FIG. 4 is a block diagram showing a configuration for a communication terminal apparatus of the first embodiment of the present invention.

Next, a description is given of a configuration for communication terminal apparatus 200 using FIG. 4. FIG. 4 is a block diagram showing a configuration for communication terminal apparatus 200.

RF receiving section 202 down-converts a signal received by antenna 201 from a radio frequency to a baseband frequency etc., for output to a GI removal section 203.

GI removal section 203 removes GI's from a received signal inputted from RF receiving section 202 for output to a fast Fourier transform (hereinafter referred to as "FFT") section 204.

After a received signal inputted by GI removal section 203 is converted from a serial data format to a parallel data format, FFT section 204 despreads each item of data converted to parallel data formed using a spreading code, subjects this to fast Fourier transformation, and outputs this to equalizer 207, channel estimation section 206 and channel quality estimation section 205.

Channel quality estimation section 205 estimates channel quality from a received signal subjected to FFT inputted by FFT section 204 and outputs the estimation results to subcarrier selecting section 214 and channel quality information forming section 215.

Channel quality estimation section 205 takes, for example, an SIR (Signal to Interferer Ratio) as estimation results. The estimation results are not limited to SIR, and arbitrary estimation results such as CIR (Carrier to Interferer Ratio), etc., can also be used.

Channel estimation section 206 performs channel estimation using a received signal subjected to FFT inputted by FFT section 204 and outputs estimation results to equalizer 207.

Equalizer 207 corrects amplitude and phase distortion using estimation results inputted by channel estimation section 206 for received signals subjected to FFT inputted by FFT section 204 for output to separating section 208.

Separating section 208 separates the received signal input by equalizer 207 into a control channel signal and a data channel signal, outputs the control channel signal to control information extraction section 211, and outputs the data channel signal to demodulating sections 209-1 to 209-N.

Demodulating sections 209-1 to 209-N subject a received signal inputted by separating section 208 to adaptive modulation in accordance with modulation scheme information inputted by allocation information extraction section 212 for every subcarrier and output the result to parallel/serial (hereinafter abbreviated to "P/S") converter 210.

P/S converter 210 converts the received signals inputted by decoding sections 209-1 to 209-N from parallel data format to serial data format to acquire received signal data.

Control information extraction section 211 extracts control information from the received signal inputted by separating section 208 and outputs this to allocation information extraction section 212 and subcarrier number information extraction section 213.

Allocation information extraction section 212 extracts modulation scheme information and subcarrier number information from control information inputted by control information extraction section 211 and outputs modulation scheme information for each subcarrier to corresponding demodulating section 209-1 to 209-N by referring to the subcarrier number information.

Subcarrier number information extraction section 213 extracts subcarrier number information from control information inputted by control information extraction section 211 and outputs this to subcarrier selecting section 214.

Subcarrier selecting section 214 selects subcarriers for the number of subcarriers designated by the base station apparatus using subcarrier number information inputted by subcarrier number information extraction section 213 in order of good channel quality using SIR measurement results inputted by channel quality estimation section 205. Subcarrier selecting section 214 outputs selected subcarrier information to channel quality information forming section 215.

Channel quality information forming section 215 constituting a channel quality information generating section has a reference table storing channel quality selection information associating SIR's and CQI's, and selects CQI's by referring to channel quality selection information employing SIR inputted by channel quality estimation section 205 for each subcarrier selected using subcarrier information inputted by subcarrier selecting section 214. Channel quality information forming section 215 outputs CQI's to RF transmission section 216 for every selected subcarrier.

RF transmission section 216 up-converts etc. a transmission signal containing CQI's inputted by channel quality information forming section 215 from a baseband frequency to a radio frequency and transmits this to antenna 201.

Figure 5:
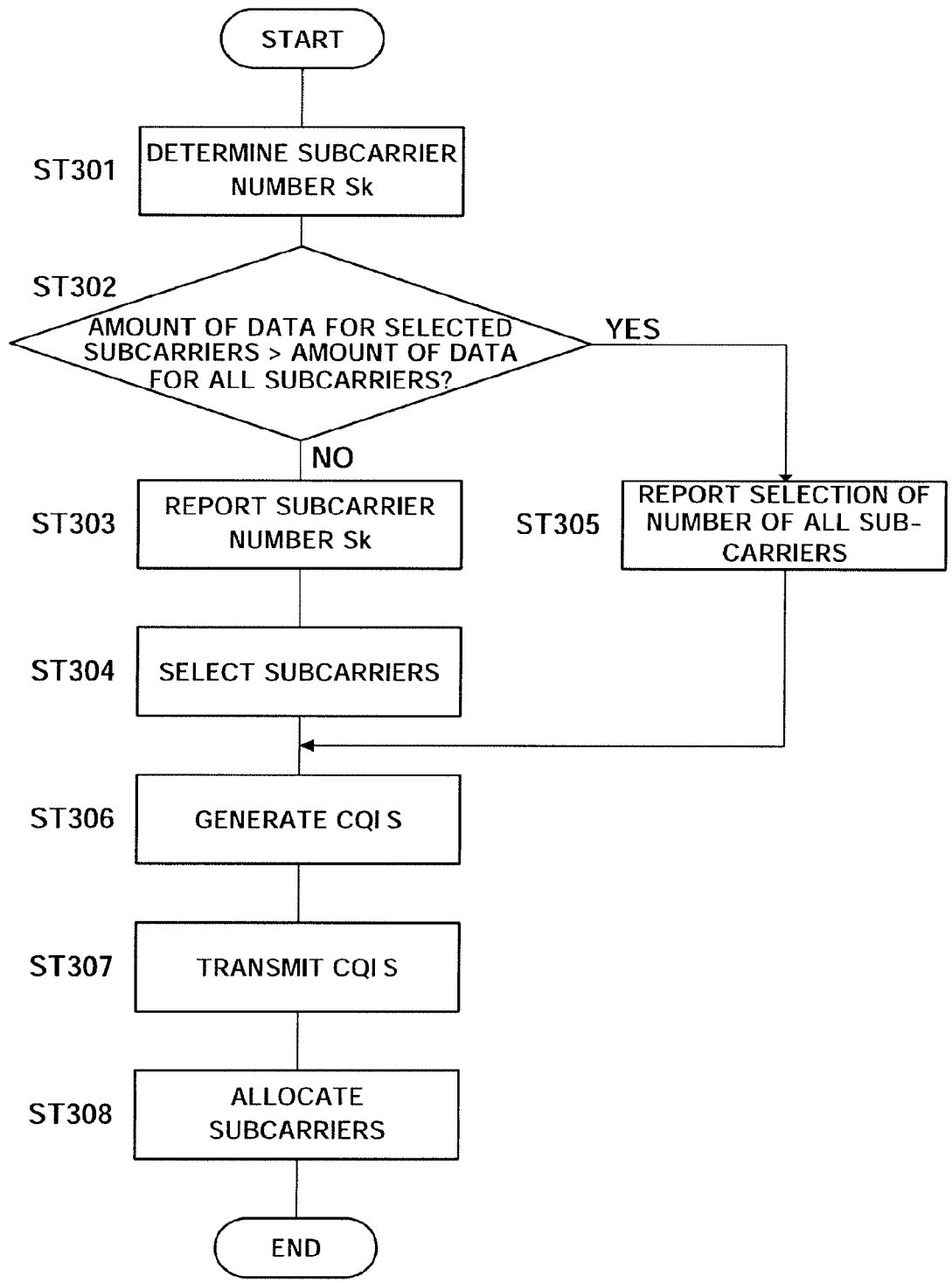
FIG. 5 is a flowchart showing a method of allocating subcarriers of the first embodiment of the present invention.

Next, a description is given of a subcarrier allocation method using FIG. 5. FIG. 5 is a flowchart showing a method for allocating subcarriers.

First, required subcarrier number determining section 105 determines the subcarrier number $S_k$ (where k is a user number and is an arbitrary natural number of two or more) allocated to each communication terminal apparatus 200 using the user information (step ST301).

Required subcarrier number determining section 105 obtains the subcarrier number $S_k$ from the following equation (1) or (2).

$$S_k = \lceil \alpha \times R_k / r \rceil \tag{1}$$

where $S_k$: subcarrier number (where k is a user number that is a natural number of 2 or more), α: constant, $R_k$: required transmission rate of communication terminal apparatus 200-$k$ (where k is user number and is a natural number of 2 or more), r: transmission rate for one subcarrier while employing modulation coding schemes having a highest transmission rate or having a transmission rate for one subcarrier while using modulation coding schemes satisfying a required packet error rate using a channel quality value of a value that is a sum of average signal to noise ratio and a constant γ (for example, a constant of γ=0 to 3 dB); and ⌈α×$R_k$/r⌉: integer larger than (α×$R_k$/r).

$$S_k = \lceil (\beta \times R_k \times N)/(R_1 + R_2 + \ldots + R_k) \rceil \quad (2)$$

where $S_k$: subcarrier number (where k is a user number that is a natural number of 2 or more), β: constant (for example, (β=2.0 to 4.0), $R_k$: required transmission rate of communication terminal apparatus 200-$k$ (where k is user number and is a natural number of 2 or more), N: the total number of subcarriers, and $\lceil (\beta \times R_k \times N)/(R_1 + R_2 + \ldots + R_k) \rceil$: integer larger than $((\beta \times R_k \times N)/(R_1 + R_2 + \ldots R_k))$ Equation (1) is for determining the number of subcarriers by using the required transmission rate for each communication terminal apparatus and the modulation scheme and encoding rates for which transmission rate is a maximum, or determining the number of subcarriers by using the required transmission rate for each communication terminal apparatus and a transmission rate per subcarrier when using a modulation scheme and encoding rate satisfying the desired error rate for the average reception quality of each communication terminal apparatus. Further, equation (2) is for determining the number of subcarriers using the ratio of the number of all subcarriers within the frequency band and the required transmission rate for each communication terminal apparatus, and the total of the required transmission rate for all communicating parties.

Next, required subcarrier number determining section 105 calculates the total amount of data for the CQI's and subcarrier number information for the selected subcarriers for each communication terminal apparatus 200 and determines whether or not the total amount of data for the CQI's and subcarrier number information for the selected subcarriers is larger than the total amount of data for CQI's for all subcarriers (for example, 64 subcarriers) within a predetermined communication band (step ST302). Namely, required subcarrier number determining section 105 determines whether or not equation (3) is satisfied.

$$Sk > (Q \times N)/(Q + \log_2 N) \quad (3)$$

Here, Q: encoding bit number required for quantizing SNR information; and

N: total number of subcarriers.

In the event that the total amount of data for the selected subcarrier CQI's and subcarrier number information is not larger than the total amount of data for CQI's for all of the subcarriers within a predetermined communication band (i.e., when equation (3) is not satisfied), required subcarrier number determining section 105 determines the subcarrier number $S_k$ as the subcarrier number information to be sent to communication terminal apparatus 200-$k$. Required subcarrier number information generating section 107 then generates the subcarrier number $S_k$ as subcarrier number information and transmits and reports the subcarrier number information to communication terminal apparatus 200-$k$ (step ST303).

Next, communication terminal apparatus 200-$k$ that received the subcarrier number information extracts subcarrier number information from the received signal at the subcarrier number information extraction section 213, and $S_k$ subcarriers are then selected at the channel quality information forming section 215 in order of good reception quality (step ST304).

On the other hand, in step ST302, in the event that the total amount of data for the selected subcarrier CQI's and subcarrier number information is larger than the total amount of data for CQI's for all of the subcarriers within a predetermined communication band (i.e. equation (3) is satisfied), required subcarrier number determining section 105 determines to have CQI's transmitted from communication terminal apparatus 200-$k$ for all of the subcarriers and determines to select the number of all the subcarriers. Required subcarrier number information generating section 107 then generates subcarrier number information selecting all of the subcarriers, and this subcarrier number information is reported to communication terminal apparatus 200-$k$ (step ST305).

Next, channel quality information forming section 215 of communication terminal apparatus 200 generates CQI's for each selected subcarrier or for all of the subcarriers (step ST306).

After this, communication terminal apparatus 200 sends generated CQI's and subcarrier number information generated by the CQI's in the SNR reporting format shown in FIG. 6, to wireless communication apparatus 100 (step ST307). FIG. 6 shows SNR report bits and subcarrier number information for two subcarriers. As shown in FIG. 6, the SNR report bit is "3" and the subcarrier number information is "0" for the first subcarrier, and the SNR report bit is "3" and subcarrier number information is "4" for the second subcarrier.

Next, CQI's are extracted from the received signal at channel quality information extraction section 103 of wireless communication apparatus 100 and subcarriers are allocated to communication terminal apparatus 200-$k$ at allocation control section 104 (step ST308).

According to the first embodiment, the base station apparatus determines the number of subcarriers allocated every communication terminal apparatus based on required transmission rate of each communication terminal apparatus and transmits the determined subcarrier number information to communication terminal apparatus. This means that the communication terminal apparatus only has to generate and transmit CQI's for the number of subcarriers allocated by the base station apparatus. As a result, it is possible to reduce the amount of control information and improve communication efficiency.

Moreover, according to the first embodiment, in the event that the total amount of data for CQI's and subcarrier number information for the number of subcarriers allocated to the communication terminal apparatus of each user is larger than the total amount of data for CQI's for all of the subcarriers, the base station apparatus only has to transmit CQI's for all of the subcarriers to the communication terminal apparatus. This means that amount of data transmitted to the uplink can be reduced by that proportion of subcarrier number information that the communication terminal apparatus does not transmit.

Moreover, according to the first embodiment, the communication terminal apparatus selects a number of subcarriers designated by base station apparatus using subcarrier number information in order of good channel quality and reports this to the base station apparatus. It is therefore possible to obtain a user diversity effect as a result of it being possible for the base station apparatus to allocate packet data to subcarriers of good reception quality, the throughput of the system as a whole can be improved, and frequency utilization efficiency can be improved.

Second Embodiment

Figure 7:
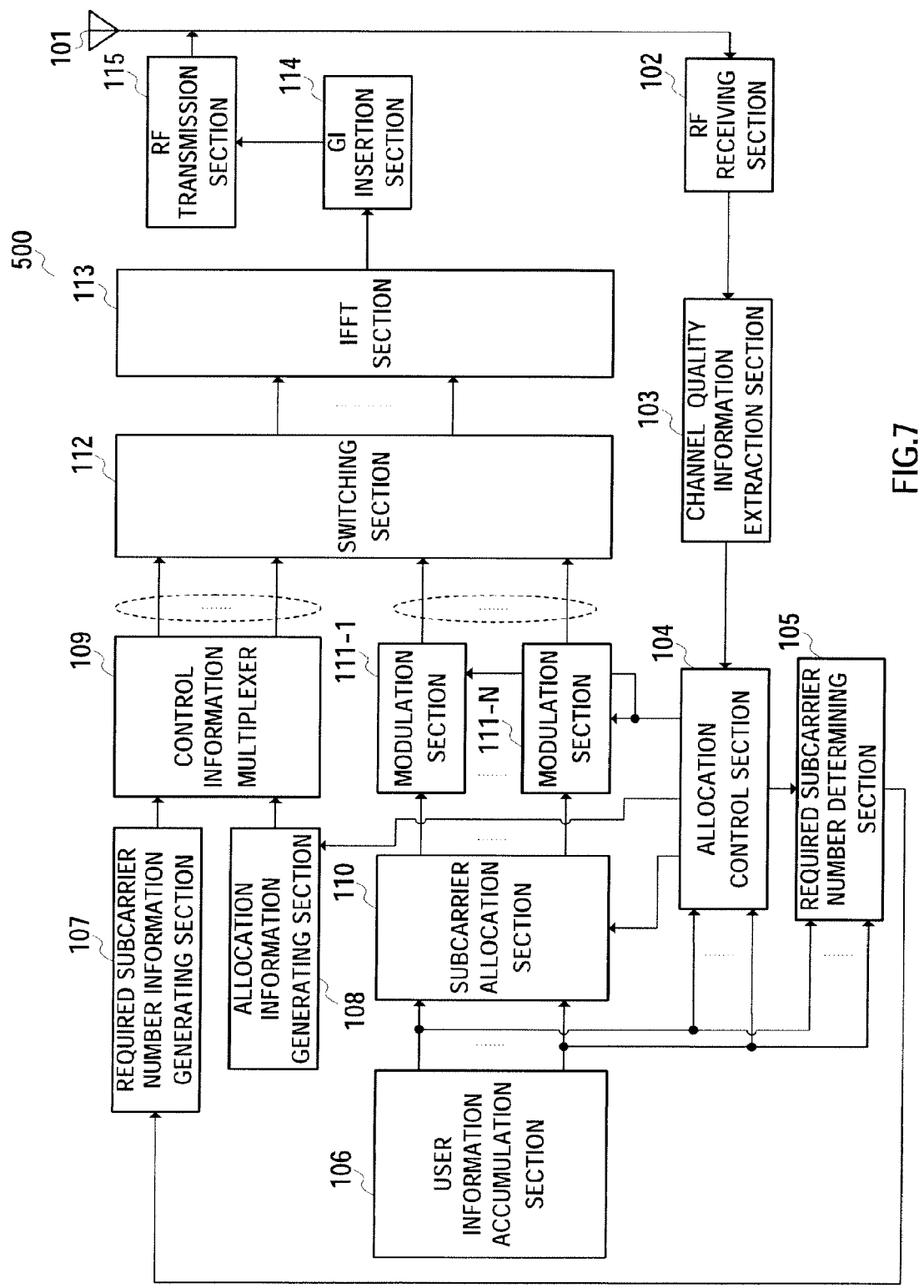
FIG. 7 is a block diagram showing a configuration for a wireless communication apparatus of a second embodiment of the present invention.

FIG. 7 is a block diagram showing a configuration for wireless communication apparatus 500 of a second embodiment of the present invention. In FIG. 7, portions with the same configuration as for FIG. 3 are given the same numerals and are not described. Further, the configuration of the communication terminal apparatus is the same as the configuration of FIG. 4 and is therefore not described.

Allocation control section 104 allocates subcarriers to communication terminal apparatus of each user using CQI's inputted by channel quality information extraction section 103 and user information for communication terminal apparatus of each user inputted by user information accumulation section 106. Allocation control section 104 then outputs allocated subcarrier allocation information to subcarrier allocation section 110 and outputs modulation scheme information for the selected modulation scheme to modulation sections 111-1 to 111-N. Allocation control section 104 carries out allocation of subcarriers and modulation schemes to each communicating party so as to achieve less than a predetermined PER value for every subcarrier. Allocation control section 104 outputs subcarrier number information at communication terminal apparatus of each user allocated with actual packet data to required subcarrier number determining section 105 in frame units.

Required subcarrier number determining section 105 determines the number of subcarriers for the communication terminal apparatus for which a subcarrier is allocated for one frame previous to the current frame using subcarrier number information actually allocated at allocation control section 104 inputted by allocation control section 104, and outputs the determined subcarrier number information to required subcarrier number information generating section 107. On the other hand, for communication terminal apparatus to which subcarriers are not allocated in one frame previous to the current frame, required subcarrier number determining section 105 determines the number of subcarriers that can be allocated from user information for each communication terminal apparatus inputted by user information accumulation section 106 and outputs the determined subcarrier number information to required subcarrier number information generating section 107.

Figure 8:
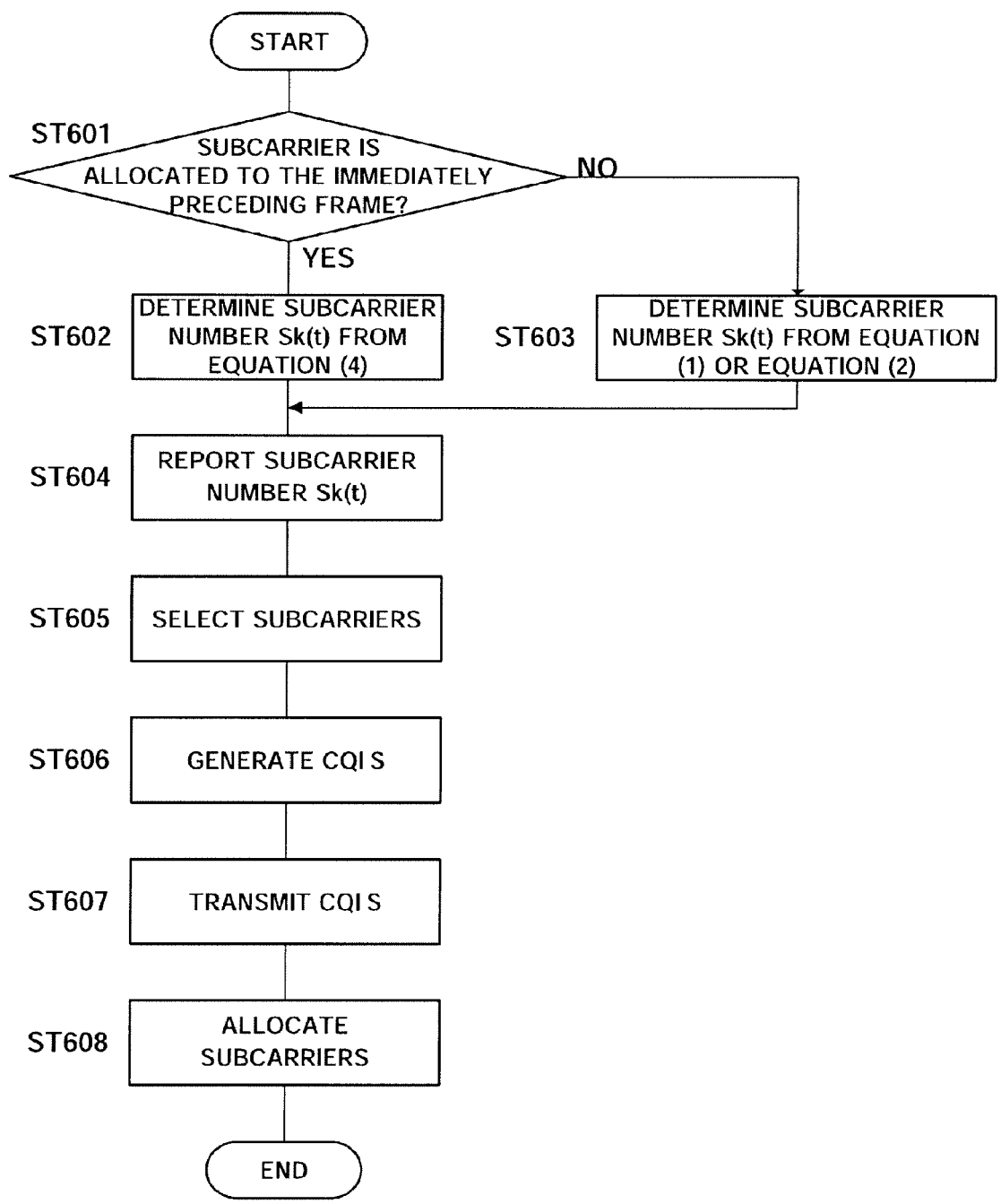
FIG. 8 is a flowchart showing a method of allocating subcarriers of the second embodiment of the present invention.

Next, a description is given of a subcarrier allocation method using FIG. 8. FIG. 8 is a flowchart showing a method for allocating subcarriers.

First, allocation control section 104 determines whether or not a subcarrier is allocated to the immediately preceding frame one frame previous to the current frame (step ST601).

In the event that a subcarrier is allocated to the immediately preceding frame, subcarrier number $S_k(t)$ is determined for subcarrier number information transmitted at the current frame from equation (4) (step ST602).

$$S_k(t) = \delta \times S'_k(t-1) \quad (4)$$

Here, $S_k(t)$: number of subcarriers of the current frame,
S'k(t−1): the number of subcarriers actually allocated to communication terminal apparatus 200-$k$ one frame previous to the current frame, and
$\delta$: constant (where 2.0☐$\delta$).

In the event where the communication terminal apparatus has stopped or the amount of movement of the communication terminal apparatus is small, it is possible to determine the number of subcarriers using equation (4) on the side of the communication terminal apparatus as a result of it being possible to estimate that fluctuation in channel quality will be slight.

On the other hand, in step ST601, in the event that a subcarrier is not allocated to the immediately preceding frame, subcarrier number $S_k(t)$ is determined for subcarrier number information transmitted at the current frame from equation (1) or equation (2) (step ST603).

Next, required subcarrier number information generating section 107 generates the subcarrier number $S_k(t)$ as subcarrier number information and reports the subcarrier number information to communication terminal apparatus 200-$k$ (step ST604).

After this, communication terminal apparatus 200-$k$ that received the subcarrier number information extracts subcarrier number information from the received signal at the subcarrier number information extraction section 213, and $S_k$ subcarriers are then selected at the channel quality information forming section 215 in order of good reception quality (step ST605).

Next, channel quality information forming section 215 of communication terminal apparatus 200 generates CQI's for each selected subcarrier or for all of the subcarriers (step ST606).

After this, communication terminal apparatus 200 sends generated CQI's and subcarrier number information generated by the CQI's in the SNR reporting format shown in FIG. 6 to wireless communication apparatus 500 (step ST607).

Next, CQI's are extracted from the received signal at channel quality information extraction section 103 of wireless communication apparatus 500 and subcarriers are allocated to communication terminal apparatus 200-$k$ at allocation control section 104 (step ST608).

According to the second embodiment, the base station apparatus determines the number of subcarriers allocated every communication terminal apparatus of each user based on required transmission rate of each communication terminal apparatus and transmits the determined subcarrier number information to communication terminal apparatus. This means that the communication terminal apparatus has only to generate and transmit CQI's for the number of subcarriers allocated by the base station apparatus. As a result, it is possible to reduce the amount of control information and improve communication efficiency.

According to the second embodiment, the base station apparatus determines the number of subcarriers using a straightforward method of simply multiplying the number of subcarriers for one frame previous to the current frame with a constant. It is therefore possible to implement straightforward processing for allocating subcarriers and achieve high-speeds in cases where the speed of movement of communication terminal apparatus is slow or in cases where communication terminal apparatus have stopped.

Moreover, according to the second embodiment, the communication terminal apparatus selects a number of subcarriers designated by base station apparatus using subcarrier information in order of good channel quality and reports the base station apparatus. It is therefore possible to obtain a user diversity effect as a result of it being possible for the base station apparatus to allocate packet data to subcarriers of good reception quality and to effectively improve the throughput of the system as a whole.

In the first and second embodiments, CQI's are adopted as channel quality information but this is by no means limiting and arbitrary information other than CQI's may also be used. Further, wireless communication apparatus 100 of the first embodiment and wireless communication apparatus 500 of the second embodiment are applicable to base station apparatus.

Each function block employed in the description of each of the aforementioned embodiments may typically be implemented as an LSI constituted by an integrated circuit. These may be individual chips or partially or totally contained on a single chip.

"LSI" is adopted here but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application in biotechnology is also possible.

This specification is based on Japanese patent application No. 2003-295972, filed on Aug. 20, 2003, the entire content of which is incorporated herein by reference.

INDUSTRIAL APPLICABILITY

The base station apparatus and subcarrier allocation method of the present invention reduce the amount of control information transmitted and as such are effective in improving communication efficiency, and are therefore useful in allocation of subcarriers.

What is claimed is:

1. A base station for receiving a channel quality indicator from a mobile station, comprising:
    a transmitter, which, in operation, transmits to the mobile station, control information designating one of (i) transmission of position information indicating positions of subcarriers selected by the mobile station within a communication band and transmission of channel quality indicators for the selected subcarriers, and (ii) transmission of channel quality indicators for all subcarriers within the communication band without position information indicating positions of subcarriers, wherein, in one operation, a data volume of summation of the position information and the channel quality indicators for the selected subcarriers, to be transmitted in (i), is smaller than a data volume of the channel quality indicators for all the subcarriers within the communication band to be transmitted in (ii); and
    a receiver, which, in operation, receives, from the mobile station, one of (i) the position information and the channel quality indicators for the selected subcarriers, and (ii) the channel quality indicators for all the subcarriers within the communication band.

2. A receiving method for receiving a channel quality indicator from a mobile station, comprising:
    transmitting to the mobile station, control information designating one of (i) transmission of position information indicating positions of subcarriers selected by the mobile station within a communication band and transmission of channel quality indicators for the selected subcarriers, and (ii) transmission of channel quality indicators for all subcarriers within the communication band without position information indicating positions of subcarriers, wherein, in one operation, a data volume of summation of the position information and the channel quality indicators for the selected subcarriers, to be transmitted in (i), is smaller than a data volume of the channel quality indicators for all the subcarriers within the communication band to be transmitted in (ii); and
    receiving, from the mobile station, one of (i) the position information and the channel quality indicators for the selected subcarriers, and (ii) the channel quality indicators for all the subcarriers within the communication band.

* * * * *

UNITED STATES PATENT AND TRADEMARK OFFICE
CERTIFICATE OF CORRECTION

PATENT NO. : 9,055,599 B2  
APPLICATION NO. : 13/754645  
DATED : June 9, 2015  
INVENTOR(S) : Jun Cheng et al.

Page 1 of 1

It is certified that error appears in the above-identified patent and that said Letters Patent is hereby corrected as shown below:

On page 2, col. 2, lines 35 and 39,

Item (56):
"Mitsubishi Electric, "Text proposal for NACK-based CQI feedback (TR 25.999 6.1.1)," Tdoc R1-030490, Agenda Item: 15.1 (HSDPA Enhancements), 3GPP TSG RAN WG1#32, Paris, France, May 19-23, 2003, 7 pages." should read, --Mitsubishi Electric, "Text proposal for NACK-based CQI feedback (TR 25.899 6.1.1)," Tdoc R1-030490, Agenda Item: 15.1 (HSDPA Enhancements), 3GPP TSG RAN WG1#32, Paris, France, May 19-23, 2003, 7 pages.--.

Item (56):
"Philips, "Discussion and text proposal for CQI enhancement in compressed mode," Tdoc R1-030473, Agenda Item: 15.1, 3GPP TSG RAN WG1#32, Marne-la-Valle, Paris, France, May 19-23, 2003, 4 pages." should read, --Philips, "Discussion and text proposal for CQI enhancement in compressed mode," Tdoc R1-030473, Agenda Item: 15.1, 3GPP TSG RAN WG1#32, Marne-la-Vallee, Paris, France, May 19-23, 2003, 4 pages.--.

Signed and Sealed this  
Twentieth Day of October, 2015

Michelle K. Lee  
*Director of the United States Patent and Trademark Office*